United States Patent [19]

Ogura et al.

[11] Patent Number: 5,555,542
[45] Date of Patent: Sep. 10, 1996

[54] PACKET DIRECTIONAL PATH IDENTIFIER TRANSFER SYSTEM

[75] Inventors: Takao Ogura; Shigeo Amemiya; Koji Tezuka; Takafumi Chujo, all of Kawasaki, Japan

[73] Assignee: Fujitsu Limited, Kawasaki, Japan

[21] Appl. No.: 583,962

[22] Filed: Jan. 11, 1996

Related U.S. Application Data

[63] Continuation of Ser. No. 969,240, filed as PCT/JP92/0072 Jun. 17, 1992 published as WO92/22972 Dec. 23, 1992, abandoned.

[30] Foreign Application Priority Data

Jun. 19, 1991 [JP] Japan .................. 3-147248

[51] Int. Cl.$^6$ .................................. H04L 12/56
[52] U.S. Cl. .......................... 370/94.1; 370/118
[58] Field of Search .................... 370/60, 54, 94.1, 370/94.3, 118

[56] References Cited

U.S. PATENT DOCUMENTS 5,166,927  11/1992  Iida et al. .................. 370/54
5,249,178  9/1993   Kurano et al. .............. 370/60

FOREIGN PATENT DOCUMENTS

| 59-215150 | 12/1984 | Japan . |
| 64-16041  | 1/1989  | Japan . |
| 2-78373   | 3/1990  | Japan . |
| 2-76435   | 3/1990  | Japan . |
| 2-211564  | 8/1990  | Japan . |
| 3-19546   | 1/1991  | Japan . |

Primary Examiner—Douglas W. Olms
Assistant Examiner—Min Jung
Attorney, Agent, or Firm—Staas & Halsey

[57] ABSTRACT

A packet directional path identifier transfer system contains on the transmission side thereof, a means 2 of converting packet directional path identifier data into bit map information in which an address of each bit corresponds to a packet directional path identifier. The system contains on the reception side thereof, a means 5 for inversely converting the bit map information of the packet directional path identifier data to the packet directional path identifier data. Otherwise, the system further contains on the transmission side thereof, means 8 and 10 for determining the top and bottom values of the packet directional path identifier data to be transmitted, and a means 9 for converting the packet directional path identifier data between the top and bottom values into bit map information, and at the reception side thereof, a means 13 for inversely converting into the initial packet directional path identifier data the bit map information of the packet directional path identifier between the top and bottom values. Further, the top value of the identifier(s) of the newly-set packet directional path(s) determined from the non-used packet directional path identifier(s) in the outgoing packet directional path of the transmission-side node and the number of the newly-set packet directional path identifier(s) are transmitted, and a reference is made to the incoming packet directional path identifier table at the reception-side node to recognize the newly-set packet directional path(s) based on the information received. (FIGS. 1 and 2.)

12 Claims, 10 Drawing Sheets cross-connection apparatus

PACKET DIRECTIONAL PATH IDENTIFIER TRANSFER SYSTEM

This application is a continuation of application Ser. No. 07/969,240, filed as PCT/JP92/00772 Jun. 17, 1992 published as WO92/22972 Dec. 23, 1992, now abandoned.

TECHNICAL FIELD

The present invention relates to a system for transferring numbers which identify a plurality of packet directional paths (each comprising a bundle of packet communication channels), i.e., packet directional path identifiers, between communication units. Each communication unit has a function of communication in a high speed packet communication network, for example, between adjoining nodes, between units in the nodes, between a node and an operation center, and the like. Generally, a plurality of packet directional path identifiers can be set for each optical fiber between nodes adjoining each other in a high speed packet communication network.

The present invention is applicable to a high speed packet communication network which will be described below.

Generally, a logical packet communication route from a sender of a packet to a receiver thereof is set via a plurality of nodes in a network, and a packet directional path containing a plurality of such packet communication routes is set between each of the adjoining nodes. Generally, a physical transmission line (for example, an optical fiber) between nodes contains a plurality of packet directional paths as above. The plurality of packet directional paths is identified with identification numbers, respectively, and nodes on a route of a packet each have a cross-connection device which connects a plurality of incoming packet directional paths at the node to corresponding outgoing packet directional paths. Information on which incoming packet directional path is to be connected to which outgoing packet directional path is supplied in advance as routing information to the cross-connection device at each node from an operation system which controls the high speed packet communication network. Further, each packet contains an area in which an identification number (packet directional path identifier) for a packet directional path is indicated when the packet is being sent along the packet directional path, and the cross-connection device at each node rewrites the content of that area according to a conversion table the cross connection apparatus has therein. Therefore, it is necessary to recognize at each node what packet directional paths are set in the incoming and outgoing packet directional paths, respectively, and what identification numbers are set for the packet directional paths.

BACKGROUND ART

Generally, however, since a great number of packet directional paths are to be set for each optical fiber between adjoining nodes in a high speed packet communication network, the identification numbers for the packet directional paths are extremely variable. Therefore, a great amount of data is necessary for transfer of such a packet directional path identifier. As a result, technical advance producing more effective and efficient transfer of the packet directional path identifier have been anxiously awaited.

For example, identifiers (identification numbers) ranging from 0 to 4095 can be set for 4096 packet directional paths for each link. Conventionally, identifiers are transferred "as is" from a node to an adjoining node, for example, when transferring information on packet directional paths to be newly set between nodes; information on a packet directional path in which a fault is detected at a node (information indicating a packet directional path in which the fault has occurred); or information on a faulty packet directional path detected at an interface unit in a node, to a controller in the same node, or the like. Thus, the amount of data required for transfer of each packet directional path identifier is as much as 12 bits. Consequently 12×4096 bits are required in total. More specifically in the conventional packet directional path identifier transfer system, the amount of transferred information is extremely large.

DISCLOSURE OF THE INVENTION

The present invention has as an object to provide a packet directional path identifier transferring system in which transfer with a reduced amount of information is possible.

According to the first aspect of the present invention, there is provided a packet directional path identifier transfer system for transferring an identifier(s) of a packet directional path(s) from a first communication unit to a second communication unit in a high speed packet communication network, where each of the first and second communication units has a function of communication, and a plurality of packet directional paths can be set for each link between adjoining nodes in the high speed packet communication network. The packet directional path identifier transfer system comprises a transmitter portion in the first communication unit opposing the second communication unit, and a receiver portion in the second communication unit opposing the first communication unit. The transmitter portion in the first communication unit comprises a packet directional path identifier generating unit for generating a packet directional path identifier(s) to be transferred; a packet directional path identifier converting unit for converting the packet directional path identifier(s) into bit map data in which an address of each bit corresponds to a packet directional path identifier value; and a packet directional path identifier transfer unit for transferring the bit map data thus obtained through the conversion. The above receiver portion in the second communication unit comprises a bit map information receiving unit for receiving packet directional path identifier data in the form of bit map data; a valid bit detecting unit for detecting a valid bit(s) in the packet directional path identifier data of the bit map form; and an identifier detecting unit for detecting the packet directional path identifier(s) included in the bit map form data based on the addresses of the valid bit(s).

According to the second aspect of the present invention, there is provided a packet directional path identifier transfer system for transferring an identifier(s) of a packet directional path(s) from a first communication unit to a second communication unit in a high speed packet communication network, where each of the first and second communication units has a function of communication, a plurality of packet directional paths can be set for each link between adjoining nodes in the high speed packet communication network, and the identifiers are sequentially ordered. The packet directional path identifier transfer system comprises a transmitter portion in the first communication unit opposing the second communication unit, and a receiver portion in the second communication unit opposing the first communication unit. The transmitter portion in the first communication unit comprises an identifier generating unit for generating a packet directional path identifier(s) to be transferred; a top identifier detecting unit for detecting, based on the sequential order, a top value of the packet directional path identifier(s) to be transferred; a bottom identifier detecting unit for detecting a bottom value of the packet directional path identifier(s) to be transferred; a bit map converting unit for converting, at least in a range from the top to bottom packet directional path identifiers, the packet directional path identifier(s) into bit map data in which an address of each bit corresponds to a packet directional path identifier value; and a bit map/top/bottom identifier transfer unit for transferring the top value, the bottom value, and the bit map data between the top and bottom values. The above receiver portion in the second communication unit comprises a bit map information receiving unit for receiving the top value, the bottom value, and the bit map data of the packet directional path identifier(s); a valid bit detecting unit for detecting a valid bit(s) in the packet directional path identifier data of the bit map form; and an identifier detecting unit for recognizing the position(s) (address(es)) of the valid bit(s) based on the top and bottom values to detect the packet directional path identifier(s) included in the bit map form data.

According to the third aspect of the present invention, there is provided a packet directional path identifier transfer system for determining, at a first one of adjoining node apparatuses in a high speed packet communication network, an identifier(s) for one or more packet directional paths to be newly set between the first one and a second node apparatus, and transferring the identifier(s) for the newly-set packet directional paths to the remaining node apparatus, where the identifier(s) can be sequentially ordered. The first one of the node apparatuses comprises an outgoing directional path identifier table containing an identifier(s) of non-used packet directional path(s) in an outgoing directional path outgoing to the second node apparatus; a non-used identifier detecting unit for searching the outgoing directional path identifier table to detect an identifier(s) of a non-used packet directional path(s) which can be newly set; an identifier determining unit for setting an identifier(s) of a necessary number of new packet directional paths among the identifiers of the detected non-used packet directional paths; and a top identifier/requested identifier number transfer unit for transferring a top value of the identifier(s) of the newly set packet directional path(s) and the number of the identifiers of the newly set packet directional paths. The second node apparatus comprises an incoming directional path identifier table containing an identifier(s) of a non-used packet directional path(s) in an incoming directional path incoming from the one node apparatus; a top identifier/requested identifier number receiving unit for receiving a top value of the identifier(s) of the packet directional path(s) newly set between the adjoining nodes and the number of the-identifiers of the newly set packet directional paths; and an identifier table searching unit for searching the inclining directional path identifier table to determine a packet directional path identifier(s) beginning with the top value, among the identifiers of the non-used packet directional paths in the incoming directional path identifier table, as the identifier(s) for the newly set packet directional path(s), where the number of the determined packet directional path identifiers is equal to the number of identifiers of the packet directional paths newly set.

BEST MODE OF CARRYING OUT THE INVENTION

Figure 1:
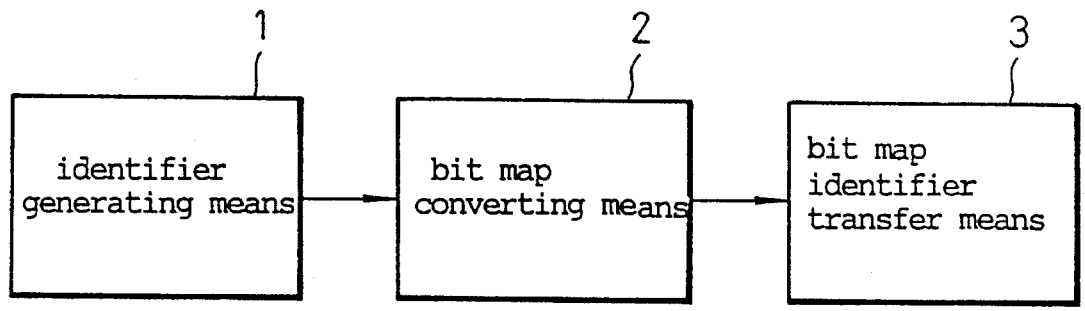
FIG. 1 is a diagram illustrating the basic construction of the transmitter portion of the system according to the first aspect of the present invention.
Figure 2:
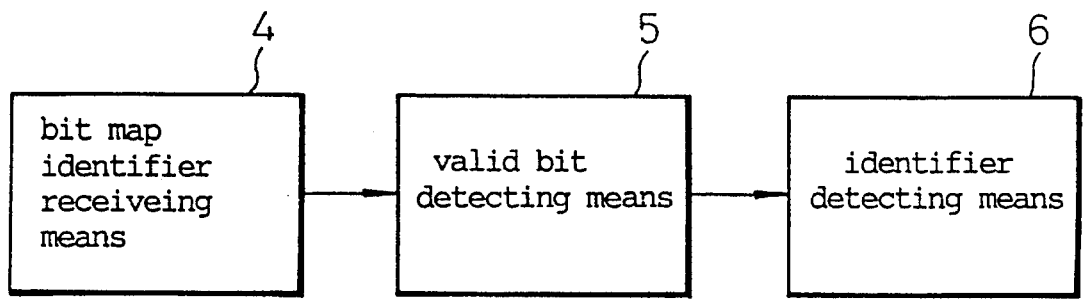
FIG. 2 is a diagram illustrating the basic construction of the receiver portion of the system according to the first aspect of the present invention.

Basic Construction of Packet Directional Path Identifier Transfer System in First Aspect of Present Invention (FIGS. 1 and 2)

FIG. 1 is a diagram illustrating the basic construction of the transmitter portion of the system according to the first aspect of the present invention. In FIG. 1, the reference numeral 1 denotes an identifier generating means, 2 denotes a bit-map converting means, and 3 denotes a bitmap information transfer means.

The identifier generating means 1 generates an identifier(s) of a packet directional path(s), to be transferred.

The bit map converting means 2 converts the packet directional path identifier(s) into bit map data in which an address of each bit corresponds to the packet directional path identifier(s).

The identifier transfer means 3 transfers the bit map data thus obtained through the conversion.

FIG. 2 is a diagram illustrating the basic construction of the receiver portion of the system according to the second aspect of the present invention. In FIG. 2, the reference numeral 4 denotes a bit map information receiving means, 5 denotes a valid bit detecting means, and 6 denotes an identifier detector.

The bitmap information receiving means 4 receives packet directional path identifier(s) data in the form of bit map data.

The valid bit detecting means 5 detects a valid bit(s) in the bit map form identifier data.

The identifier detecting means 6 recognizes, based on the address(es) of the valid bit(s), the packet directional path identifier(s) included in the bit map form data.

In the transmitter portion of the system according to the first aspect of the present invention, a packet directional path identifier(s) generated by the identifier generating means 1 end which is to be transferred is convened into bit map data in which an address of each bit corresponds to the packet directional path identifier(s), and then the converted data is transferred by the identifier transfer means 3.

In the receiver portion, the bit map information receiving means 4 receives the bit map form packet directional path identifier data transferred from the identifier transfer means 3; the valid bit detecting means 5 detects a valid bit(s) in the bit map form packet directional path identifier data; and the identifier detecting means 6 recognizes the packet directional path identifier(s) included in the bit map form data, based on the address of the valid bits.

Figure 3:
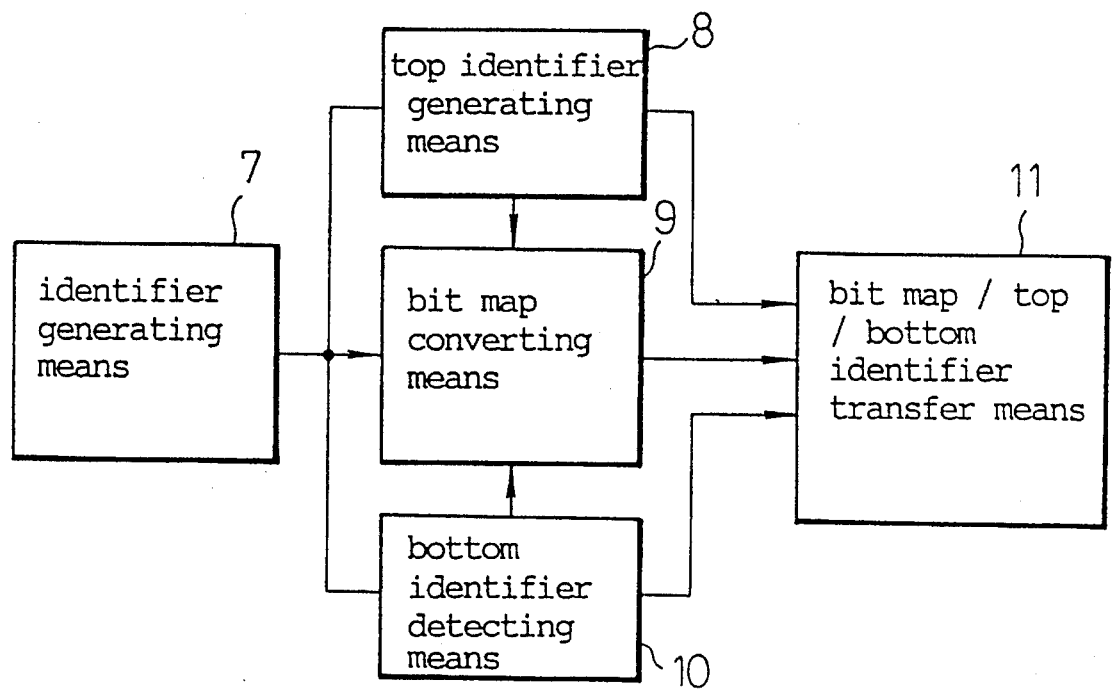
FIG. 3 is a diagram illustrating the basic construction of the transmitter portion of the system according to the second aspect of the present invention.
Figure 4:
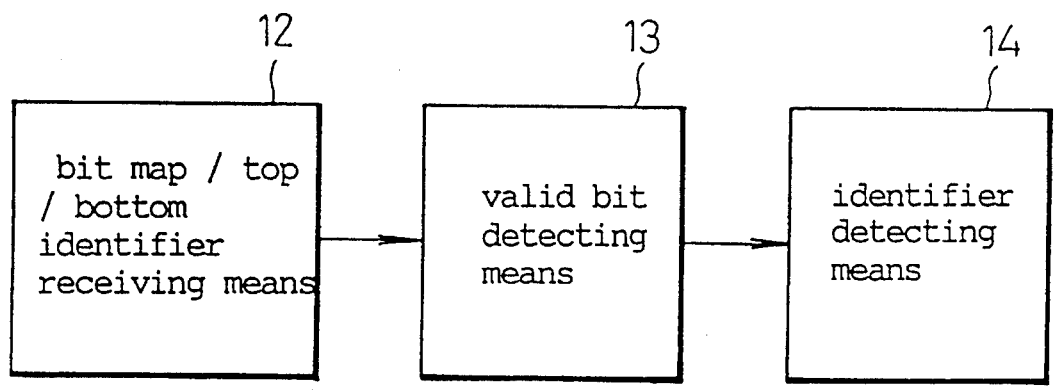
FIG. 4 is a diagram illustrating the basic construction of the receiver portion of the system according to the second aspect of the present invention.

Basic Construction of Packet Directional Path Identifier Transfer System in Second Aspect of Present Invention (FIGS. 3 and 4)

FIG. 3 is a diagram illustrating the basic construction of the transmitter portion of the system according to the second aspect of the present invention. In FIG. 3, the reference numeral 7 denotes an identifier generating means, 8 denotes a top identifier detecting means, 9 denotes a bit map converting means, 10 denotes a bottom identifier detecting means, and 11 denotes a bit map/top/bottom identifier transfer means.

The identifier generating means 7 generates a packet directional path identifier data to be transferred, where the packet directional path identifiers can be sequentially ordered.

The top identifier detecting means 8 detects a top (leading) value of the packet directional path identifier(s) to be transferred.

The bottom identifier detecting means 10 detects a bottom value of the packet directional path identifier(s) to be transferred.

The bit map converting means 9 converts, at least in a range from the top to bottom packet directional path identifiers, the packet directional path identifier(s) into bit map data in which an address of each bit corresponds to a packet directional path identifier value.

The bit map/top/bottom identifier transfer means 11 transfers the top value, the bottom value, and the bit map data between the top and bottom values.

FIG. 4 is a diagram illustrating the basic construction of the receiver portion of the system according to the second aspect of the present invention. In FIG. 4, the reference numeral 12 denotes a bit map information receiving means, 13 denotes a valid bit detecting means, and 14 denotes an identifier detecting means.

The bit map information detecting means 12 receives the top value, the bottom value, and the bit map data of the packet directional path identifier(s).

The valid bit detecting means 13 detects a valid bit(s) in the packet directional path identifier data of the bit map form.

The identifier detecting means 14 recognizes the position(s) (address(es)) of the valid bit(s) based on the top and bottom values in order to detect the packet directional path identifier(s) included in the bit map form data.

In the transmitter portion of the system according to the second aspect of the present invention, the top identifier detecting means 8 and the bottom identifier detecting means 10 detect the top and bottom values of the packet directional path identifier(s) to be transferred, respectively, where the packet directional path identifier(s) are generated by the identifier generating means 7. Then, the bit map converting means 9 converts the packet directional path identifier(s) at least between the top and bottom identifiers, into bit map data in which an address of each bit corresponds to a packet directional path identifier value. The bottom identifier detecting means 10 transfers the data, included between the top and bottom identifier, of the bit map data.

In the receiver portion, the bit map information receiving means 12 receives the top and bottom values the packet directional path identifier(s) and the bit map form data of the packet directional path identifier(s). The valid bit detecting means 13 detects the valid bit(s) in the bit map form packet directional path identifier data. Then the identifier detecting means 14 detects, based on the top and bottom identifiers, the positions (addresses) of the valid bit(s) to recognize the packet directional path identifier(s) which is included in the bit map form data.

Figure 5:
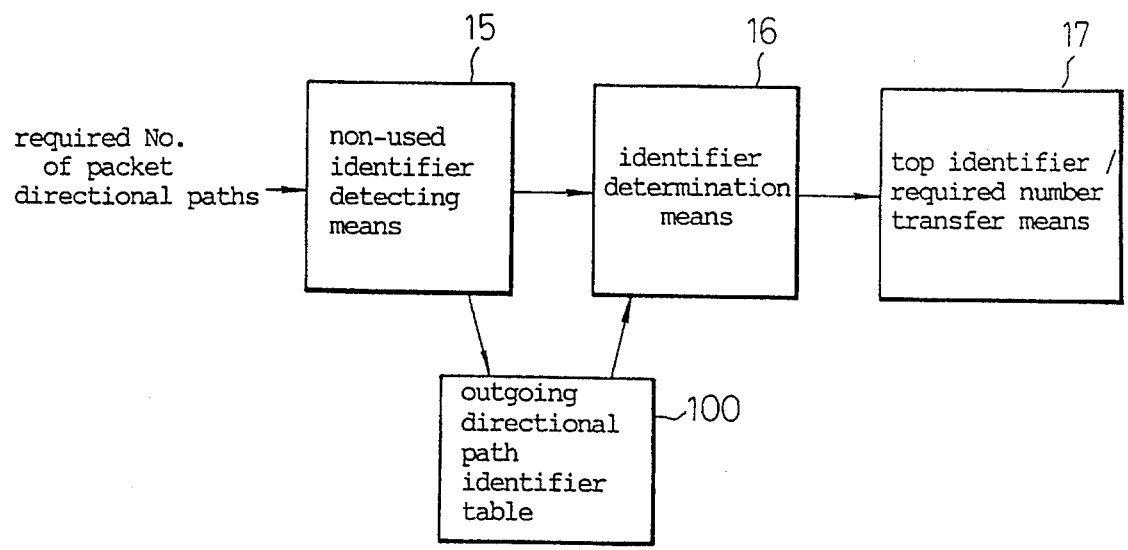
FIG. 5 is a diagram illustrating the basic construction of the transmitter portion of the system according to the third aspect of the present invention.
Figure 6:
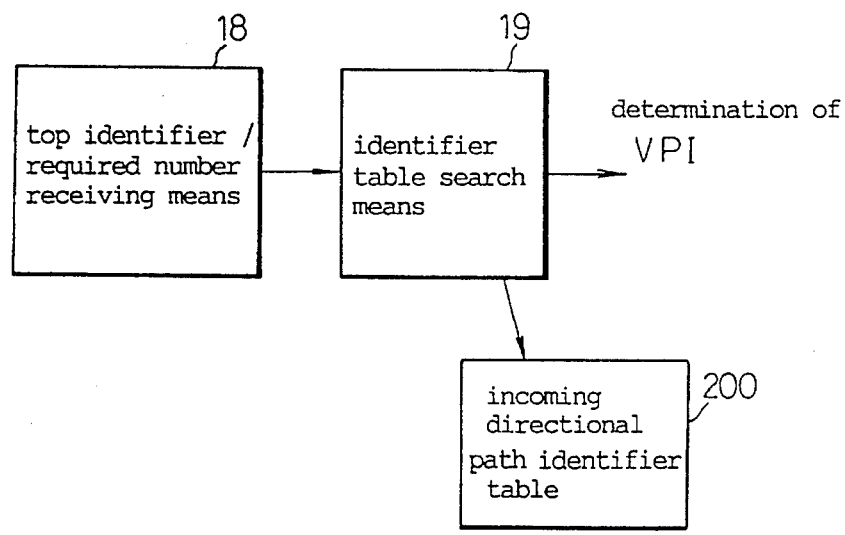
FIG. 6 is a diagram illustrating the basic construction of the receiver portion of the system according to the third aspect of the present invention.

Basic Construction of Packet Directional Path Identifier Transfer System in Third Aspect of Present Invention (FIGS. 5 and 6)

FIG. 5 is a diagram illustrating the basic construction of the receiver portion of the system according to the third aspect of the present invention. The receiver portion of the system in the third mode is constructed so that one or more packet directional path identifier(s) are newly set at one of the two adjoining nodes and the packet directional path identifier(s) thus set are transferred to the other node. In the system according to the third aspect of the present invention, it is assumed that the identifier can be sequentially ordered, that the node on the transmitter side has an outgoing packet directional path identifier table containing the identifier of non-used packet directional paths in the outgoing directional paths, and that the node on the receiver side has an incoming directional path table containing the identifiers of non-used packet directional paths in the incoming directional paths. In FIG. 5, the reference numeral 15 denotes a non-used packet directional path identifier detecting means, 16 denotes an identifier determination means, and 17 denotes a top identifier/required number transfer means.

The non-used packet directional path identifier detecting means is searches the outgoing directional path identifier table to detect an identifier(s) of a non-used packet directional path(s) which can be newly set.

The identifier determination means 16 sets an identifier(s) of a necessary number of new packet directional paths among the identifiers of the detected non-used packet directional paths.

The top identifier/required-number-of-identifier transfer means 17 transfers the top value of the identifier(s) of the newly set packet directional path(s) and the number of the identifiers of the newly set packet directional paths.

FIG. 6 is a diagram illustrating the basic construction of the receiver portion of the system according to the third aspect of the present invention. In FIG. 6, the reference numeral 18 denotes a top identifier/required-number-of-identifier receiving means, 19 denotes an identifier table searching means, and 20 denotes an identifier determination means.

The top identifier/required-number-of-identifier receiving means 18 receives the top value of the identifier(s) of the packet directional path(s) newly set between the adjoining nodes and the number of the identifiers of the newly set packet directional paths.

The identifier table searching means 19 searches the incoming directional path identifier table to determine a packet directional path identifier(s) beginning with the top value, among the identifiers of the non-used packet directional paths in the incoming directional path identifier table, as the identifier(s) for the newly set packet directional path(s), where the number of the determined packet directional path identifiers is equal to the number of identifiers of the packet directional paths newly set.

In the system according to the third aspect of the present invention, the non-used packet directional path identifier detecting means 15 in the transmitter portion searches the outgoing packet directional path identifier table containing the non-used packet directional path(s) in the outgoing directional path(s) at the node in the transmitter portion to detect the identifier(s) of the non-used packet directional path(s) which can be newly set. Further, the identifier determination means 16 newly sets the identifiers of a required number of packet directional paths selected from the detected non-used packet directional path identifiers. Further, the top identifier/required-number-of-identifier transfer means 17 transfers the top value of the packet directional path identifier(s) in the newly set packet directional path identifier(s) and the number of identifiers of the newly set packet directional paths.

In the receiver portion, the top identifier/required-number-of-identifier receiving means 18 receives the top value of the packet directional path identifier(s) in the identifier(s) of the packet directional path(s) newly set at an adjoining node and the number of identifiers of the packet directional paths newly set, and the identifier table searching means 19 searches the incoming directional path identifier table to determine a packet directional path identifier(s) beginning with the top value, among the identifiers of the non-used packet directional paths in the incoming directional path identifier table, as the identifier(s) for the newly set packet directional path(s), where the number of the determined packet directional path identifiers is equal to the number of identifiers of the packet directional paths newly set.

Embodiments (FIGS. 7 through 15)

Figure 7:
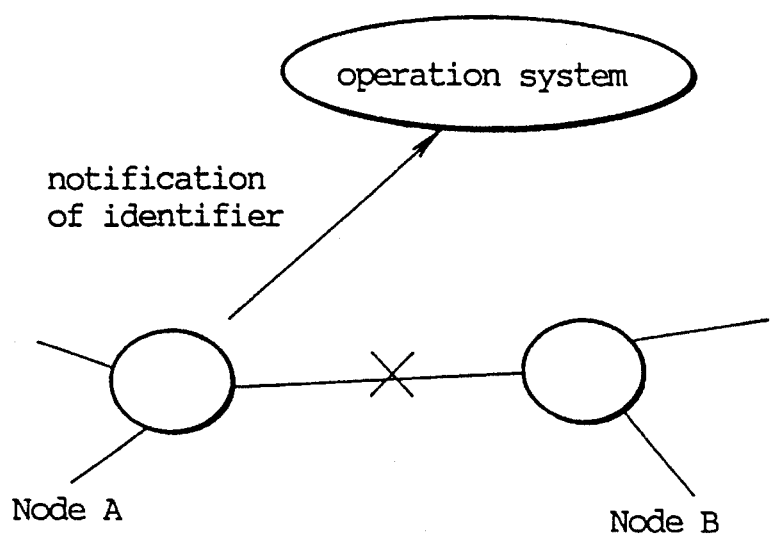
FIG. 7 is a diagram illustrating the operation of notifying a packet directional path identifier when the path is faulty.

FIG. 7 is a diagram illustrating an example of notification of a packet directional path identifier when a path is faulty.

Figure 8:
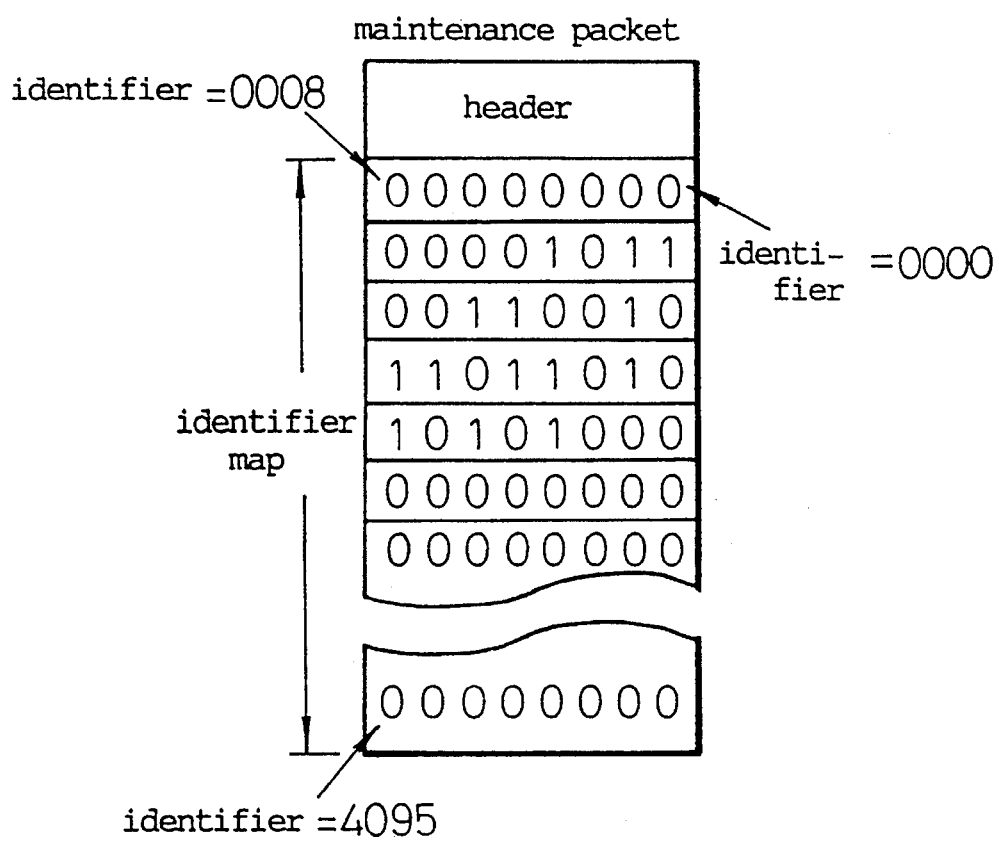
FIG. 8 is a diagram illustrating a format used when transferring a packet directional path identifier in the first embodiment of the present invention.

If a fault has occurred in a packet directional path from the node B to the node A, the node A has to detect the fault and inform the operation system, controlling the whole high speed packet communication network, of the faulty packet directional path. Generally, it is considered to be possible that a fault can occur in many packet directional paths. In this case, according to the first aspect of the present invention, each of the maintenance packets to be sent to the operating system contains bit map data comprised of, for example, 4096 bits corresponding to the identifiers ranging from 0 to 4095, as shown in FIG. 8. In this example, a bit being "1" indicates that an error has occurred at the place of the corresponding packet directional path identifier. Thus, the amount of data to be transferred can be considerably reduced compared with the prior art in which a maximum of 12×4096 bits would be required, as having been described previously.

Figure 9:
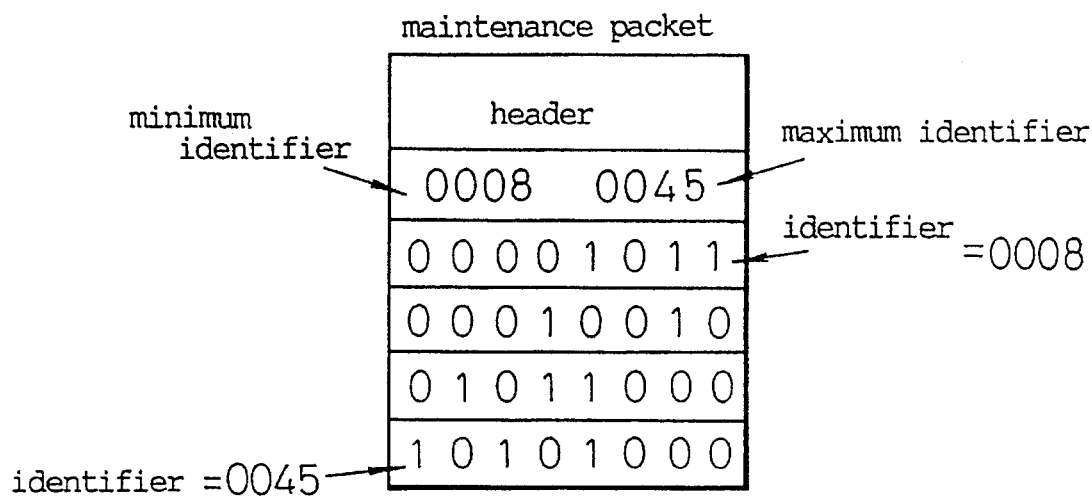
FIG. 9 is a diagram illustrating a format used when transferring a packet directional path identifier in the second embodiment of the present invention.

Further, in the packet directional path identifier transfer system according to the second aspect of the present invention, the maintenance packet to be transmitted to the operating system may contain the data as shown in FIG. 9. In the example shown in FIG. 9, the minimum value of the identifiers of the packet directional paths of which the fault is detected at the node A is "0008" and the maximum value is "0045". Thereafter, the packet directional path identifier ranging from the packet directional path identifier "0008" to the packet directional path identifier "0045" is indicated in the form of bit map data.

The transfer of one or more identifiers of a single packet directional path or a plurality of packet directional paths to any other point in the high speed packet communication network as above, is applicable to cases other than the notification of the packet directional path identifier when the path is faulty. For example, when one or more packet directional paths are newly set between one node and other nodes, the identifier(s) of the one or more packet directional paths newly set may be transferred from one node to another node, as above. The same formats as in FIGS. 8 and 9 can be used in this application.

When a single packet directional path or a plurality of packet directional paths are newly set between adjoining nodes, the packet directional path identifier transfer system, according to the third aspect of the present invention, is advantageously usable for notifying the new setting of the packet directional path identifiers from one node to another adjoining the former.

Figure 10:
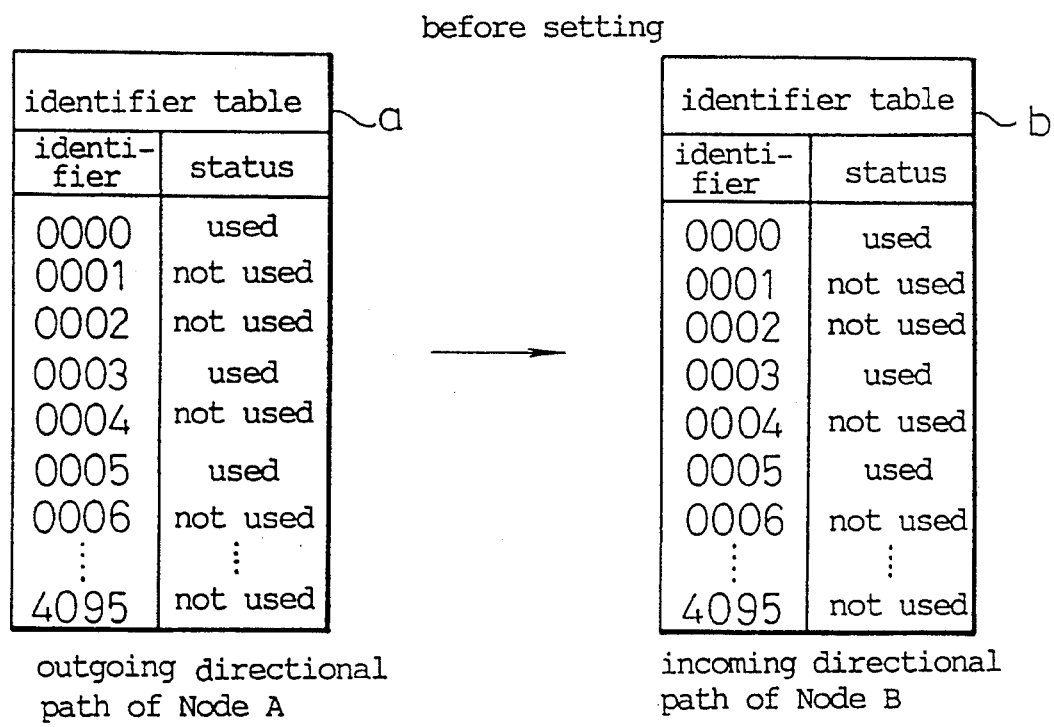
FIG. 10 is a diagram illustrating the correspondence between the use of outgoing directional path identifiers at one of two adjoining nodes and the use of incoming directional path identifiers at the other of two adjoining nodes.

FIG. 10 is a diagram illustrating the correspondence between the use of an outgoing packet directional path identifier at a first node and the use of an incoming packet directional path identifier at a second node. AS shown in FIG. 10, the packet directional path identifier tables a and b in the packet receiver and transmitter portions, respectively, hold the same information indicating whether the respective packet directional paths are used or not used.

Figure 11:
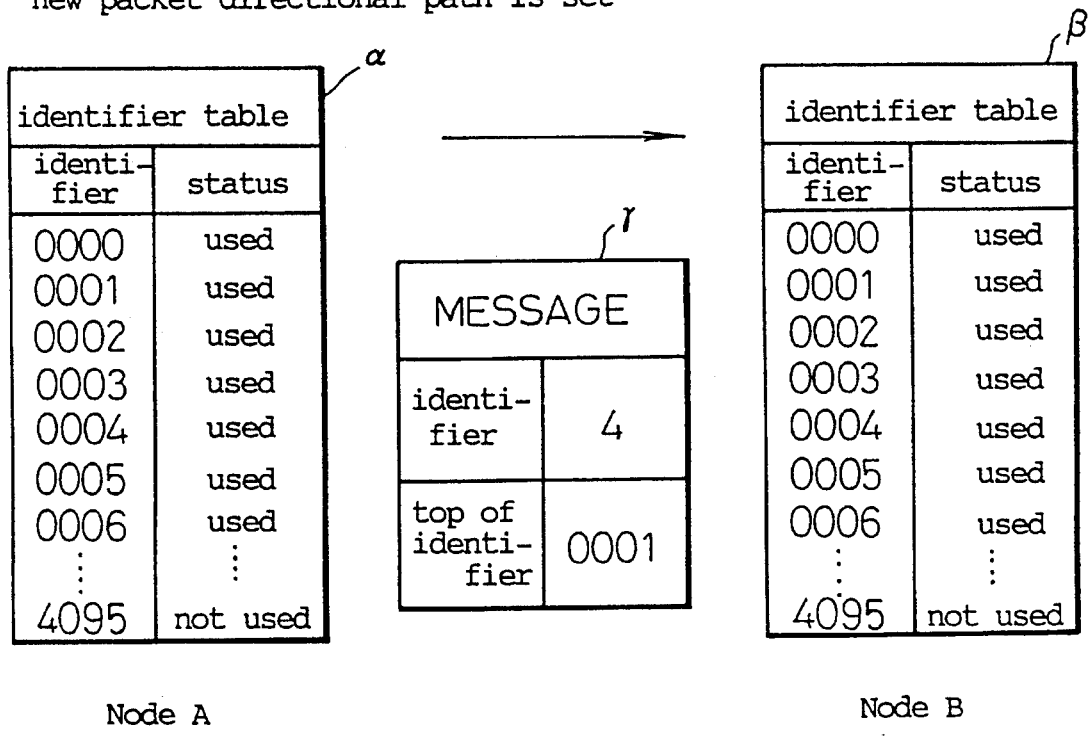
FIG. 11 is a diagram illustrating the procedure of newly setting further packet directional paths in the situation shown in FIG. 10.
Figure 12:
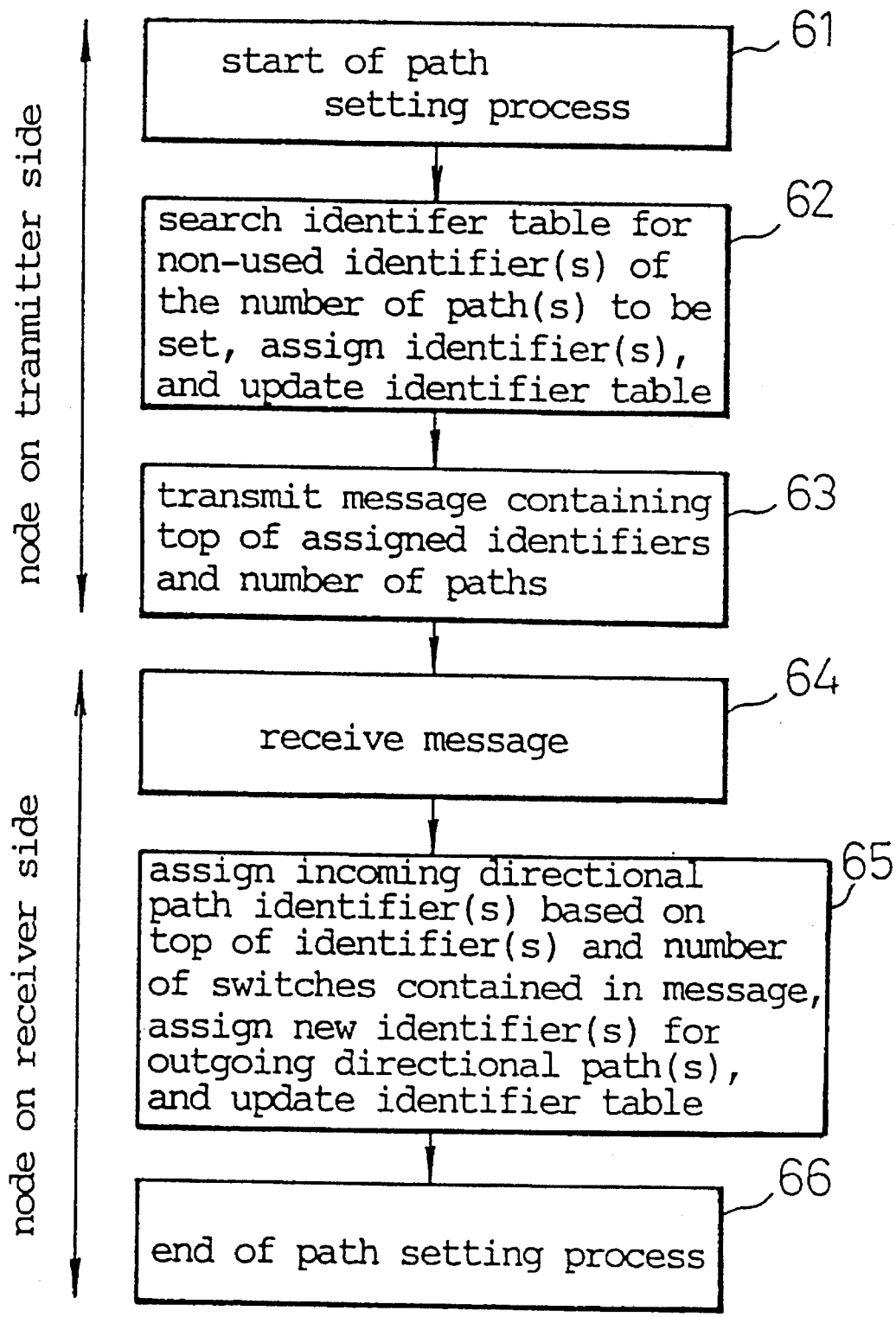
FIG. 12 is a flowchart of the procedure in FIG. 11.

FIG. 11 is a diagram illustrating the procedure of newly setting further packet directional paths for the situation shown in FIG. 10 in the packet directional path identifier transfer system, according to the third aspect of the present invention. A general flowchart of this procedure is illustrated in FIG. 12. The examples shown in FIGS. 10 and 11 will be explained below in connection with the steps in the flowchart in FIG. 12.

When the node A, for example, has to set four new packet directional paths between the node A and the node B, the node A searches for the identifiers of unused packet directional paths in the outgoing packet directional path identifier table a provided therein as shown in FIG. 10. The identifiers "0001", "0002", "0004" and "0006" of the packet directional paths, which are found successively among non-used packet directional path identifiers in the table, are determined as identifiers of four packet directional paths to be newly set. As indicated by label α in FIG. 11, the outgoing packet directional path identifier table of the node A is updated. Namely, the identifiers of the newly set four packet directional paths are made to indicate "used". (These operations are performed at step 62).

Next, as indicated by label δ in FIG. 11, the node A creates a message including, as information, the number "4" of the identifiers of the newly set four packet directional paths and the top (start point) value "0001" of these packet directional path identifiers, and transfers it to the node B (at step 63).

Receiving the above message (at step 64) and referring to the incoming directional path identifier table (indicated with b in FIG. 10) in the node B, which corresponds to the identifier table at the node A, the node B recognizes, based on the top (start point) value "0001" in the received packet directional path identifiers and the number "4" of the packet directional path identifiers, that the identifiers of the four packet directional paths to be newly set are "0001", "0002", "0004" and "0006". The identifier of these four packet directional paths in the incoming directional path identifier table (indicated with b in FIG. 10) are changed to indicate "used" (as indicated with β in FIG. 10). (These operations are performed at step 65).

Figure 13:
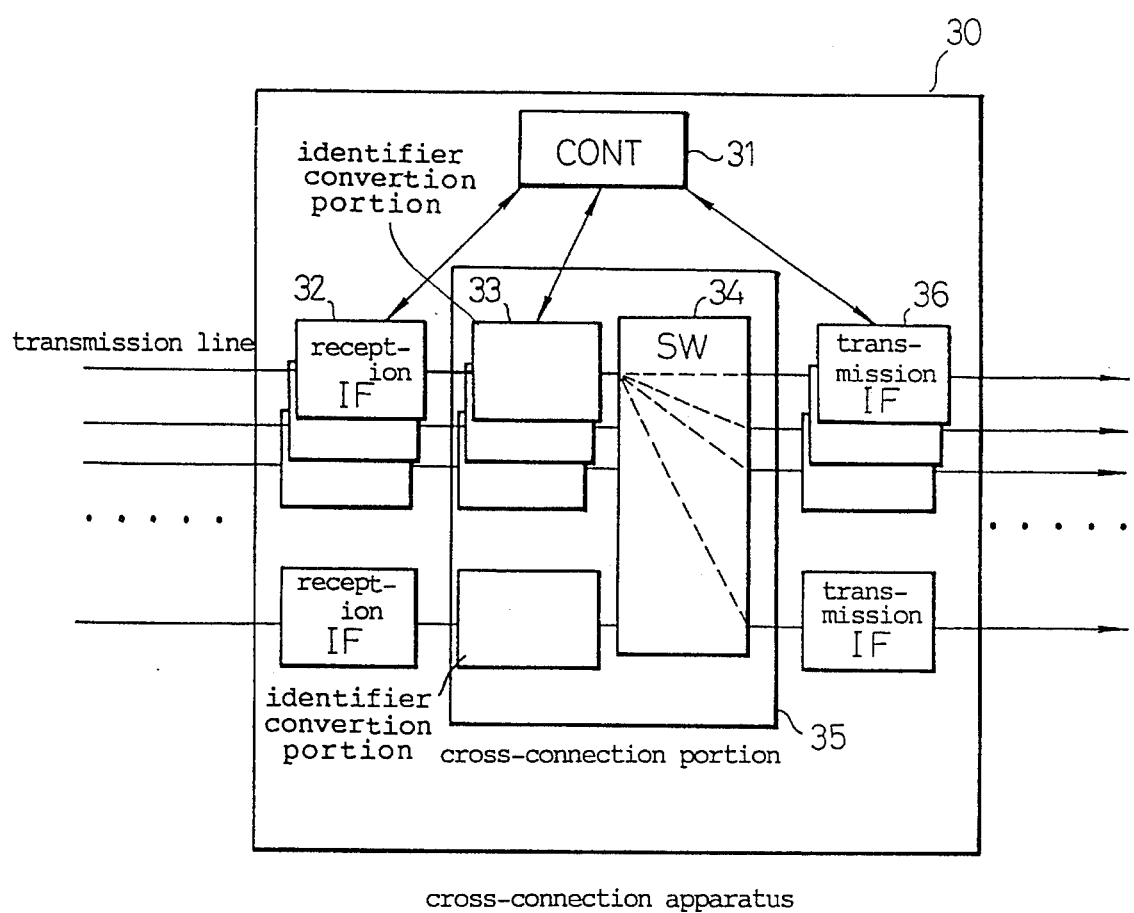
FIG. 13 is a diagram illustrating an example construction of a mode apparatus in the embodiment of the present invention.

FIG. 13 is a diagram illustrating an example construction of a cross-connection apparatus as a node apparatus used in the embodiment of the present invention. In FIG. 13, the reference numeral 30 denotes a cross-connection apparatus, 31 denotes a controller, 32 denotes a reception interface, 33 denotes an identifier converter, 34 denotes a switch portion, 35 denotes a cross-connection portion, and 36 denotes a transmission interface.

The above-mentioned packet directional path identifier tables are included in the identifier converter 33 of FIG. 13. The procedure shown in FIG. 12 is performed under control of the controller 31.

Figure 14:
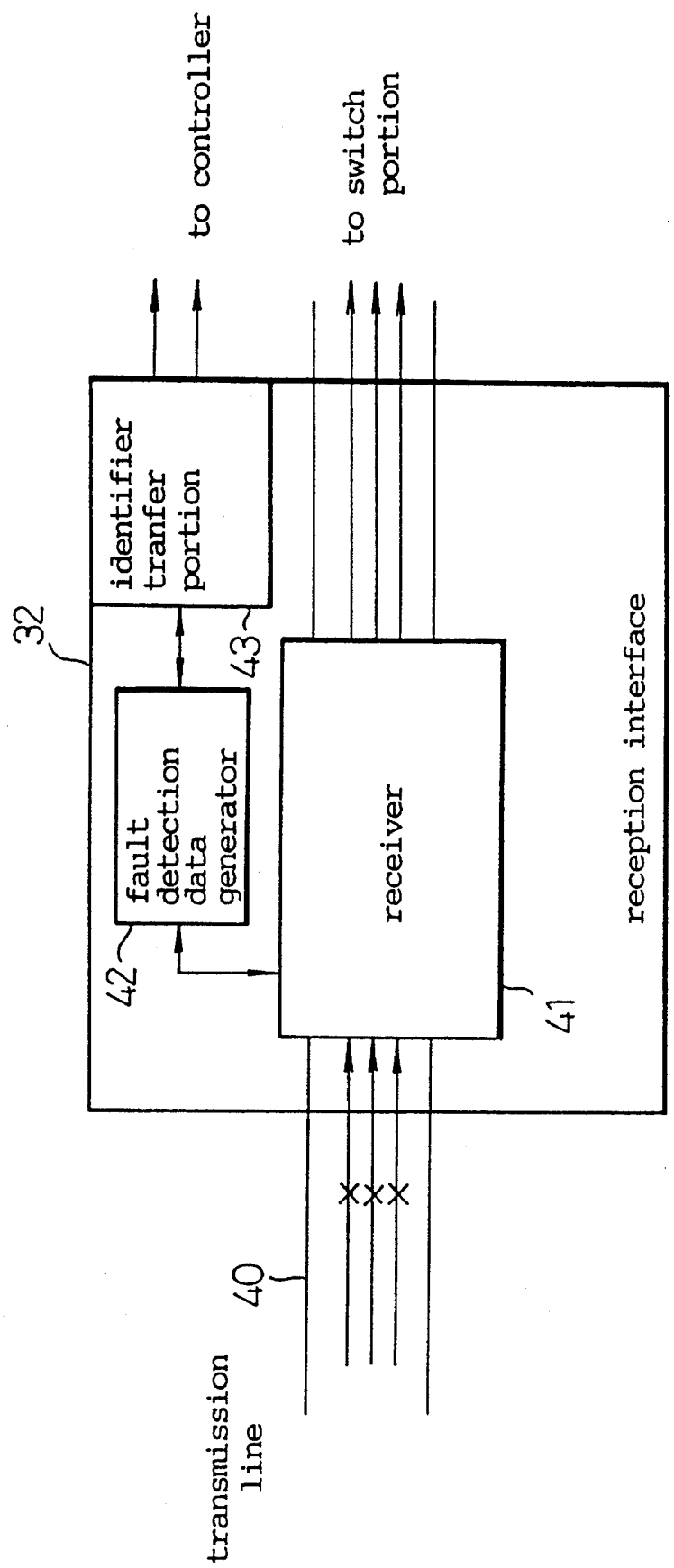
FIG. 14 is a diagram illustrating the construction of the reception interface 32 in FIG. 13.

FIG. 14 is a diagram illustrating the construction of a portion of the reception interface 32 of FIG. 13, relating to a function of notifying an occurrence of a fault. As shown in FIG. 14, the reception interface 32 comprises a receiver 41 to receive a signal transmitted through a transmission line 40, a fault-detection data generator 42, and an identifier transfer unit 43. The receiver 41 has a function to detect a fault occurring in a well-known signal-off detecting circuit, or the like (not shown). When a fault is detected, an alarm signal is generated and output to the fault-detection data generator 42. The fault-detection data generator 42 has an encoder, or the like. In response to a packet directional path for which the alarm signal has been issued, the identifier of the packet directional path is generated as fault data, and a request for transfer of the identifier of the faulty packet directional path is delivered to the identifier transfer unit 43.

Figure 15:
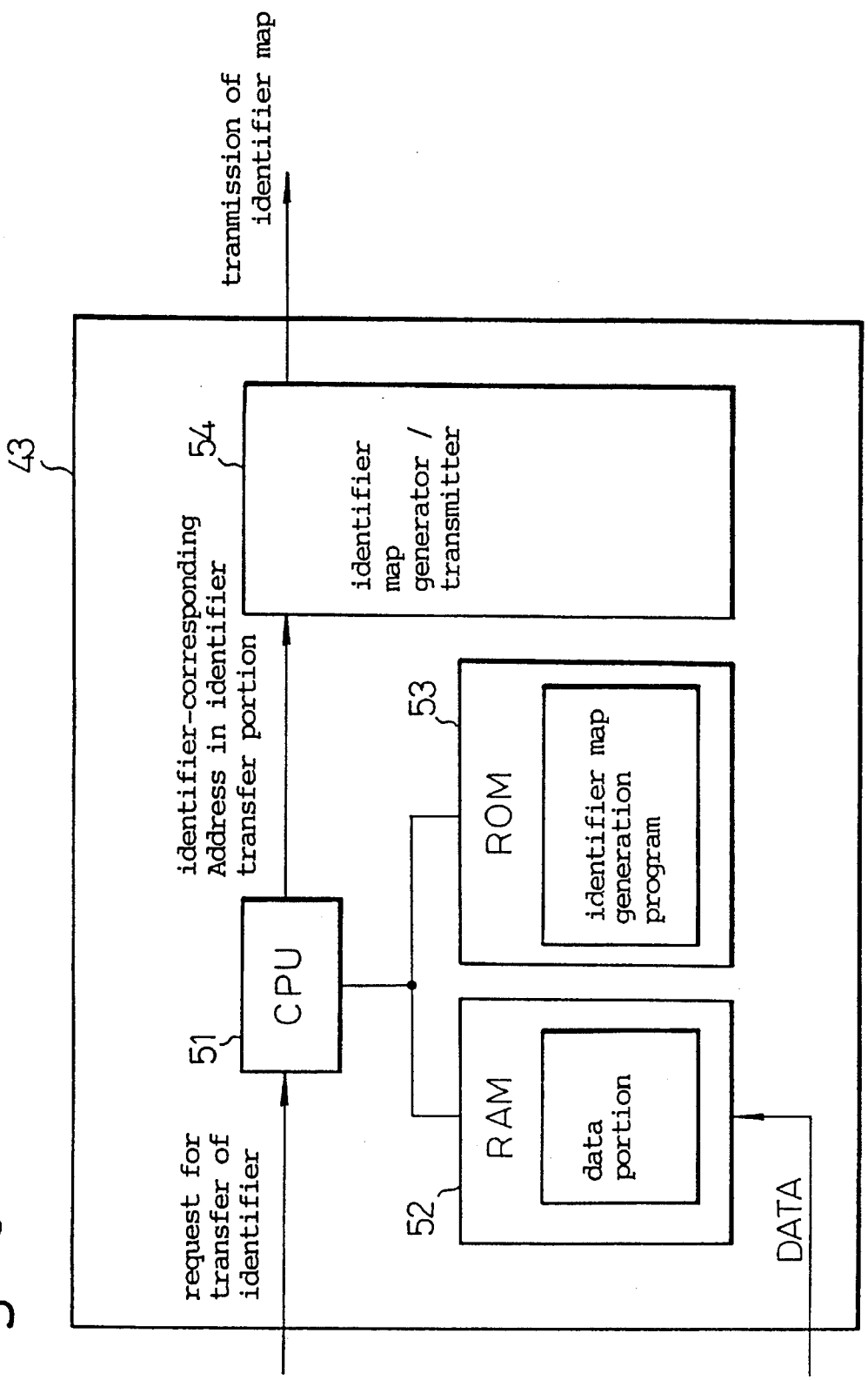
FIG. 15 is a diagram illustrating an example construction of the identifier transferring portion in FIG. 14.

FIG. 15 is a diagram illustrating an example construction of the identifier transfer unit 43 in FIG. 14. In FIG. 15, the reference numeral 51 denotes a CPU, 52 denotes a RAM, 53 denotes a ROW, and 54 denotes an identifier map generator/transmitter. The above identifier data (DATA in FIG. 15) of a faulty packet-directional path from the fault data generator 42 is written into the RAM 52, and the above request for transfer of the identifier of the faulty packet directional path is supplied to the CPU 51 which in turn will supply the identifier map generator/transmitter 54 with an address corresponding to the identifier data of the faulty packet directional path in the RAM 52 according to an identifier map generation program stored in the ROM 53. The identifier map generator/transmitter 54 has a bit map area of a RAM, where area bits correspond to all the packet directional paths (not shown) which can be accommodated by the reception interface 32 of FIG. 13. The bit corresponding to the above-mentioned address is set to "1" while the other bits are set to "0". Thus, the identifier data of the faulty packet directional path is converted into bit map data. The bit map data is transferred from the identifier map generator/transmitter 54 to the controller 31 of FIG. 13. Therefore, the transfer to the controller 31 in the cross-connection apparatus, i.e., within a node apparatus, can be performed in a shorter time, by converting a packet directional path identifier data into bit map data and transferring from the reception interface 32 to the controller 31.

It should be noted that in a node (not shown) which receives the bit map data, the operation shown in FIG. 14 may be performed reversely. More specifically, the received bit map data is expanded once in the RAM, the contents of each bit are scanned to detect an address of the "1" bit, and as a result an identifier of the packet directional path corresponding to that address is determined.

The conversion from a packet directional path identifier into bit map data and the reverse operation are performed in the same manner in the case of transfer between the nodes. In this case, the above operations are performed under control of the controller 31.

As described above, by the packet directional path identifier transfer systems according to the present invention, the amount of transferred information containing packet directional path identifiers can be reduced.

We claim:

1. A packet directional path identifier transfer system for transferring an identifier for each packet directional path from a first communication unit to a second communication unit in a high speed packet communication network containing a plurality of nodes, where a plurality of packet directional paths can be set for each link connecting two adjoining nodes among the plurality of nodes in the high speed packet communication network, said packet directional path identifier transfer system comprising:

a transmitter portion in the first communication unit for transmitting information to the second communication unit, including
packet directional path identifier determining means for determining a respective value of each identifier, where each identifier is assigned to a respective packet directional path;
bit map data generating means for generating bit map data consisting of a plurality of bits corresponding to a plurality of values, respectively, where the respective value of each identifier is represented in the bit map data by making valid a corresponding bit for the respective value; and
packet directional path identifier transfer means for transferring the bit map data generated by the bit map data generating means, to the second communication unit; and a receiver portion in the second communication unit, including
bit map information receiving means for receiving said bit map data;
valid bit detecting means for detecting at least one valid bit in the bit map data; and
identifier obtaining means for obtaining the respective value for each identifier by determining which bit in the bit map data is valid and to which value the valid bit corresponds.

2. A communication unit in a high speed packet communication network containing a plurality of nodes connected by links, where a plurality of packet directional paths can be set for each link connecting two adjoining nodes, said communication unit, transferring an identifier of at least one packet directional path to another communication unit, which communicates in the high speed packet communication network, said communication unit comprising:

identifier determining means for determining a respective value of an identifier for each packet directional path bit map data generating means for generating bit map data including a plurality of bits corresponding to a plurality of values, respectively, where the respective value of the identifier for each packet directional path is represented in the bit map data by making valid a corresponding bit for the respective value; and identifier transfer means for transferring the bit map data generated by said bit map data generating means, to the other communication unit.

3. A communication unit in a high speed packet communication network for receiving at least one identifier of at least one packet directional path transferred from another communication unit, which communicates with said communication unit in the high speed packet communication network, where a plurality of packet directional paths can be set for each link connecting two adjoining nodes, said communication unit comprising:

bit map information receiving means for receiving bit map data including a plurality of bits, each bit representing a value of a respective identifier;

valid bit detecting means for detecting a respective position of a valid bit in the bit map data; and identifier obtaining means for obtaining each respective value of each respective identifier from the bit map data based on the respective position of the valid bit.

4. A packet directional path identifier transfer system for transferring, from a first communication unit to a second communication unit, each provided in a high speed packet communication network containing a plurality of nodes connected by links, where a plurality of packet directional paths can be set for each link connecting two adjoining nodes, a respective identifier which is determined for each packet directional path of at least one packet directional path set for one of said links on an output side of one of said plurality of nodes in the high speed packet communication network, said first communication unit containing a transmitter portion for transmitting information to said second communication unit, and said second communication unit containing a receiver portion for receiving the information transmitted from said first communication unit;

said transmitter portion in the first communication unit comprising:
identifier determining means for determining respective values of respective identifiers for each packet directional path;
top identifier detecting means for detecting, a top value of respective identifiers;
bottom identifier detecting means for detecting, based on a sequential order, a bottom value of the respective identifiers;
bit map data generating means for generating bit map data comprising a plurality of bits, each bit representing a value, where each bit corresponding to the respective values of the respective identifiers determined by the identifier determining means is valid, and the bit map data begins with one of the plurality of bits which corresponds to the top value, and ends with a second one of the plurality of bits which corresponds to the bottom value, each bit having a position; and
bit map/top/bottom identifier transfer means for transferring the top value, the bottom value, and the bit map data generated by the bit map data generating means, to the second communication unit; and said receiver portion in the communication unit comprising:
bit map information receiving means for receiving the top value, the bottom value, and the bit map data;
valid bit detecting means for detecting at least one position of at least one value bit in the bit map data; and
identifier obtaining means for obtaining the respective value of the respective identifier based on the at least one position of the at least one value bit, and the top and bottom values.

5. A communication unit in a high speed packet communication network for transferring at least one identifier of at least one packet directional path to another communication unit which communicates in the high speed packet communication network containing a plurality of nodes connected by links, where a plurality of packet directional paths can be set for each link connecting two adjoining nodes among the plurality of nodes in the high speed packet communication network, said communication unit comprising:

identifier determining means for determining respective values of respective identifiers for each packet directional path of at least one packet directional path;

top identifier detecting means for detecting, based on a sequential order, a top value of the respective identifiers;

bottom identifier detecting means for detecting, based on the sequential order, a bottom value of the respective identifiers;

bit map data generating means for generating bit map data, each bit of which corresponds to a respective value of a respective identifier, where each bit corresponding to the at least one value of a respective identifier determined by the identifier determining means is valid, and the bit map data begins with a bit corresponding to the top value, and ends with a bit corresponding to the bottom value; and bit map/top/bottom identifier transfer means for transferring the top value, the bottom value, and the bit map data generated by the bit map data generating means, to the other communication unit.

6. A communication unit in a high speed packet communication network, which receives at least one identifier of at least one packet directional path, transferred from a second communication unit which communicates in the high speed packet communication network containing a plurality of nodes connected by links, where a plurality of packet directional paths can be set for each link connecting two adjoining nodes, said communication unit comprising:

bit map information receiving means for receiving a top value, a bottom value, and bit map data of the at least one identifier, said bit map data comprising a plurality of bits, each bit corresponding to a value of one of the at least one identifier;

valid bit detecting means for detecting at least one position of at least one valid bit in the bit map data; and identifier obtaining means for obtaining the at least one value of the at least one identifier based on the at least one position of the at least one valid bit, and the top and bottom values.

7. A packet directional path identifier transfer system for determining, at a first one of a plurality of node apparatus in a high speed packet communication network, at least one identifier for at least one packet directional path set between said first node apparatus and a second one of the plurality of node apparatuses located adjacent to said first node apparatus, and transferring the at least one identifier for the at least one packet directional path set to said second node apparatus, wherein:

said first node apparatus comprises:

outgoing direction path identifier table containing information on values of identifiers which are not used for a packet directional path extends from the first node apparatus to said second node apparatus;

identifier determining means for determining a respective identifier for each packet directional path of the at least one set packet directional path, from among the identifiers contained in the outgoing direction path identifier table, in accordance with a predetermined rule; and top identifier/requested identifier number transfer means for transferring a top value of the identifiers for the at least one set packet directional path and a number of the identifier respective for said each set directional path, to said second node apparatus; and said second node apparatus comprises:

incoming directional path identifier table containing said information on the values of the identifiers for said packet directional path which extends from the first node apparatus to said second node apparatus;

top identifier/requested identifier number receiving means for receiving the top value of the respective identifier for said each set packet directional path and the number of the respective identifier for said each set packet directional path; and identifier obtaining means for obtaining identifier for said each set packet directional path by searching the incoming directional path identifier table and determining a respective value of the respective identifier beginning with the top value, among the identifiers of the non-used packet directional paths contained in the incoming directional path identifier table, in accordance with said predetermined rule, so that the value of the respective identifier determined by the identifier obtaining means is equal to the top value received by the top identifier/requested identifier number receiving means.

8. A node apparatus transfer system in a high speed packet communication network comprising:

an outgoing directional path identifier table containing information on values of identifiers not used in a packet directional path which connects a first node apparatus in a high speed packet communication network with a second node apparatus in the high speed packet communication network;

identifier determining means for determining a respective identifier for at least one necessary packet directional path from among the identifiers contained in the outgoing directional path identifier table, in accordance with a predetermined rule; and top identifier/requested identifier transfer means for transferring a top value of the respective identifier for the at least one set packet directional path and a respective number of the respective identifier for the at least one set packet directional path, to the second node apparatus.

9. A node apparatus transfer system in a high speed packet communication network comprising:

incoming directional path identifier table containing information on values of identifiers not used for an incoming directional path which connects a second node apparatus with a first node apparatus;

top identifier/requested identifier number receiving means for receiving a top value of respective identifiers for the at least one packet directional path set at said second node apparatus and a respective value of the each respective identifier for the at least one set packet directional path; and identifier obtaining means for obtaining a respective identifier for each set packet directional path by searching the incoming directional path identifier table and determining a respective value of each respective identifier, beginning with the top value, among the identifiers of the not used packet directional paths contained in the incoming directional path identifier table, in accordance with a predetermined rule, so that the respective value of the respective identifier determined by the identifier obtaining means is equal to the top value received by the top identifier/requested identifier number receiving means.

10. A packet directional path identifier transfer system for a high speed packet communication network containing a plurality of nodes connected by a plurality of links, where a plurality of packet directional paths can be set for each link connecting two adjoining nodes, said packet directional path identifier transfer system comprising:

a first communication unit for transmitting information, said first communication unit containing a transmitter portion;

a second communication unit for receiving the information transmitted from said first communication unit, said second communication unit contains a receiver portion for receiving the information transmitted from said first communication unit; and means for transferring at least one identifier which is determined for at least one packet directional path of said high speed packet communication network from said first communication unit to said second communication unit, wherein:

said transmitter portion in the first communication unit comprises:

packet directional path identifier determining means for determining at least one value of at least one identifier for at least one packet directional path;

bit map data generating means for generating bit map data each bit of which corresponds to a value of the identifier, where each bit corresponding to the at least one value for the at least one identifier determined by the packet directional path identifier determining means is valid; and packet directional path identifier transfer means for transferring the bit map data generated by the bit map data generating means, to the second communication unit; and said receiver portion in the second communication unit comprises:

bit map information receiving means for receiving said bit map data;

valid bit detecting means for detecting at least one position of at least one valid bit in the bit map data; and identifier obtaining means for obtaining the at least one value of the at least one identifier from the bit map data based on the at least one position of the at least one valid bit.

11. A packet directional path identifier transfer system for a high speed packet communication network containing a plurality of nodes connected by a plurality of links, each node having an input side and an output side, where a plurality of packet directional paths can be set for each of said plurality of links connecting two adjoining nodes, and at least one identifier is determined for at least one packet direction path set for each of said links on the output side of one of said plurality of nodes, said packet directional path identifier transfer system comprising:

a first communication unit for transmitting information, said first communication unit containing a transmitter portion; and a second communication unit for receiving the information transmitted from said first communication unit, said second communication unit containing a receiver portion for receiving the information transmitted from said first communication unit; wherein:

said transmitter portion in the first communication unit comprises:

identifier determining means for determining at least one value of the at least one identifier for the at least one packet directional path;

top identifier detecting means for detecting a top value of the at least one identifier;

bottom identifier detecting means for detecting a bottom value of the at least one identifier;

bit map data generating means for generating bit map data comprising a plurality of bits, each bit of which corresponds to a value of the identifier, where each bit corresponding to the at least one value of the at least one identifier determined by the identifier determining means is valid, and the bit map data begins with one of the plurality of bits which corresponds to the top value, and ends with a second one of the plurality of bits which corresponds to the bottom value; and bit map/top/bottom identifier transfer means for transferring the top value, the bottom value, and the bit map data generated by the bit map data generating means, to the second communication unit; and said receiver portion in the communication unit comprises:

bit map information receiving means for receiving the top value, the bottom value, and the bit map data;

valid bit detecting means for detecting at least one position of the at least one valid bit in the bit map data; and identifier obtaining means for obtaining the at least one value of the at least one identifier based on the at least one position of the at least one valid bit, and the top and bottom values.

12. A packet directional path identifier transfer system for determining identifiers for packet direction paths set between node apparatus in a high speed packet communication network, said packet directional path identifier transfer system comprising:

a first one of the plurality of node apparatus;

a second one of the plurality of node apparatus located adjacent to said first node apparatus;

means for setting at least one identifier for at least one packet directional path between said first node apparatus and said second node apparatus, and transferring the at least one identifier for the at least one set packet directional path to said second node apparatus, wherein:

said first node apparatus comprises:

outgoing direction path identifier table containing information on values of identifiers which are not used for a packet directional path which goes out from the first node apparatus into said second node apparatus;

identifier determining means for determining the at least one identifier for the at least one packet direction path among the identifiers contained in the outgoing directional path identifier table, in accordance with a predetermined rule; and top identifier/requested identifier number transfer means for transferring a top value of the at least one identifier for the at least one set packet directional path and the number of the at least one identifier for the at least one set directional path, to said second node apparatus; and said second node apparatus comprises:

incoming directional path identifier table containing said information on the values of the identifiers for said packet directional path which goes out from the first node apparatus into said second node apparatus;

top identifier/requested identifier number receiving means for receiving the top value of the at least one identifier for the at least one set packet directional path and the number of the at least one identifier for the at least one set packet directional path; and identifier obtaining means for obtaining said at least one identifier for the at least one set packet directional path by searching the incoming directional path identifier table and determining at least one value of the at least one identifier beginning with the top value, among the identifiers of the packet directional paths not used which are contained in the incoming directional path identifier table, in accordance with said predetermined rule, so that the value of the at least one identifier determined by the identifier obtaining means is equal to the top value received by the top identifier/requested identifier number receiving means.

* * * * *

UNITED STATES PATENT AND TRADEMARK OFFICE
CERTIFICATE OF CORRECTION

PATENT NO. : 5,555,542
DATED : September 10, 1996
INVENTOR(S) : Takao Ogura et al.

It is certified that error appears in the above-identified patent and that said Letters Patent is hereby corrected as shown below:

"In the drawings"

Fig. 8, "identifier=0008" should be --identifier=0007--.

Fig. 9, "0045" should be --0039-- (both occurrences).

Column 8, line 15, "0045" should be --0039--.

line 17, "0045" should be --0039--.

Column 9, line 1, "$\delta$" should be --$\gamma$--.

line 17, "10)" should be --11)--.

Signed and Sealed this

First Day of June, 1999

Attest:

Attesting Officer

Q. TODD DICKINSON

Acting Commissioner of Patents and Trademarks